(12) United States Patent
Yancey

(10) Patent No.: US 10,708,269 B1
(45) Date of Patent: Jul. 7, 2020

(54) HOSTED APPLICATION ACCESS MANAGEMENT

(71) Applicant: Amazon Technologies, Inc., Seattle, WA (US)

(72) Inventor: Justin Paul Yancey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 15/783,123

(22) Filed: Oct. 13, 2017

(51) Int. Cl.
| | |
|---|---|
| *G06F 21/00* | (2013.01) |
| *H04L 29/06* | (2006.01) |
| *G06F 21/60* | (2013.01) |
| *G06F 21/31* | (2013.01) |
| *G06F 21/45* | (2013.01) |
| *G06F 21/30* | (2013.01) |
| *H04L 9/32* | (2006.01) |
| *G06F 21/62* | (2013.01) |

(52) U.S. Cl.
CPC .......... *H04L 63/0884* (2013.01); *G06F 21/30* (2013.01); *G06F 21/31* (2013.01); *G06F 21/45* (2013.01); *G06F 21/604* (2013.01); *H04L 63/10* (2013.01); *G06F 21/62* (2013.01); *H04L 9/321* (2013.01); *H04L 63/20* (2013.01)

(58) Field of Classification Search
CPC .......... G06F 21/31; G06F 21/30; G06F 21/33; G06F 21/335; G06F 21/34; G06F 21/45; G06F 21/62; G06F 21/6209; G06F 21/6218; G06F 21/629
See application file for complete search history.

(56) References Cited

U.S. PATENT DOCUMENTS

| | | | |
|---|---|---|---|
| 2010/0017596 A1* | 1/2010 | Schertzinger | G06F 21/33 713/155 |
| 2014/0013409 A1* | 1/2014 | Halageri | H04L 63/0815 726/8 |

* cited by examiner

*Primary Examiner* — Edward Zee
(74) *Attorney, Agent, or Firm* — Lowenstein Sandler LLP

(57) ABSTRACT

A method and system for managing requests from a customer system domain, the requests for access to an application executed by a web service in a cloud computing environment. In one embodiment, an access management system includes an authentication layer and an authorization layer. The authentication layer includes a proxy web service to receive a request for access to an application according to a membership-based authentication protocol and generate an object to be passed to an interface of the web-based execution platform. A second object is generated including user identity and membership information. The second object is configured with a protocol that enables processing by the web-based execution platform. The web-based execution platform receives the second object, extracts the authentication information in the second protocol, and translates the authentication information of the second object back into the first object as in the original request. Using the first object, the application determines a validity of the request.

19 Claims, 5 Drawing Sheets

FIG. 2

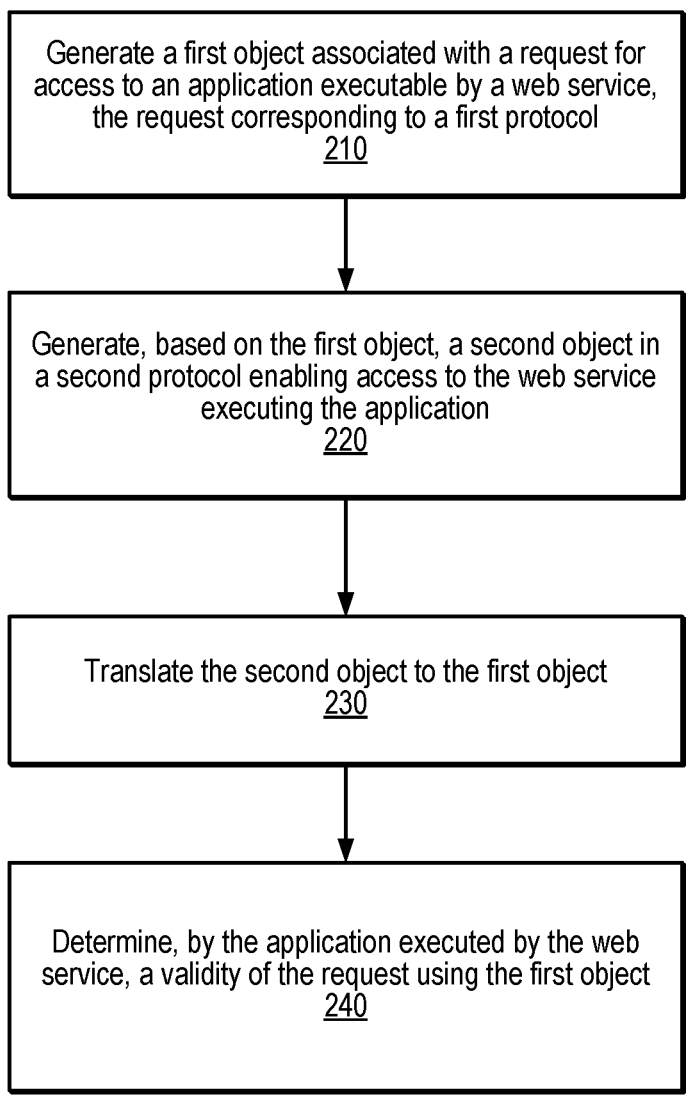

```
Generate a first object associated with a request for
access to an application executable by a web service,
the request corresponding to a first protocol
210
```

```
Generate, based on the first object, a second object in
a second protocol enabling access to the web service
executing the application
220
```

```
Translate the second object to the first object
230
```

```
Determine, by the application executed by the web
service, a validity of the request using the first object
240
```

HOSTED APPLICATION ACCESS MANAGEMENT

BACKGROUND

Many enterprise applications are designed to implement user authentication employing a roles or group membership-based authorization and authentication protocol, such as the Microsoft Windows® Active Directory® directory service. Directory services for Windows® domain networks assign permissions to roles or groups, to which users or other "nested" groups are made members in order to grant and control access to resources.

A customer environment including many client systems may employ a "membership" access model, like Active Directory, to issue client certificates to establish access control rights as it relates to one or more applications. However, cloud-based application execution platforms may employ an authentication model that includes restrictions relating to the management of groups. For example, cloud environment authentication models may not support group nesting, set a maximum number of total groups, restrict users to membership in a maximum number of groups, etc.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 2 is a flow diagram illustrating an example method of access management processing, according to one embodiment.

Figure 1:
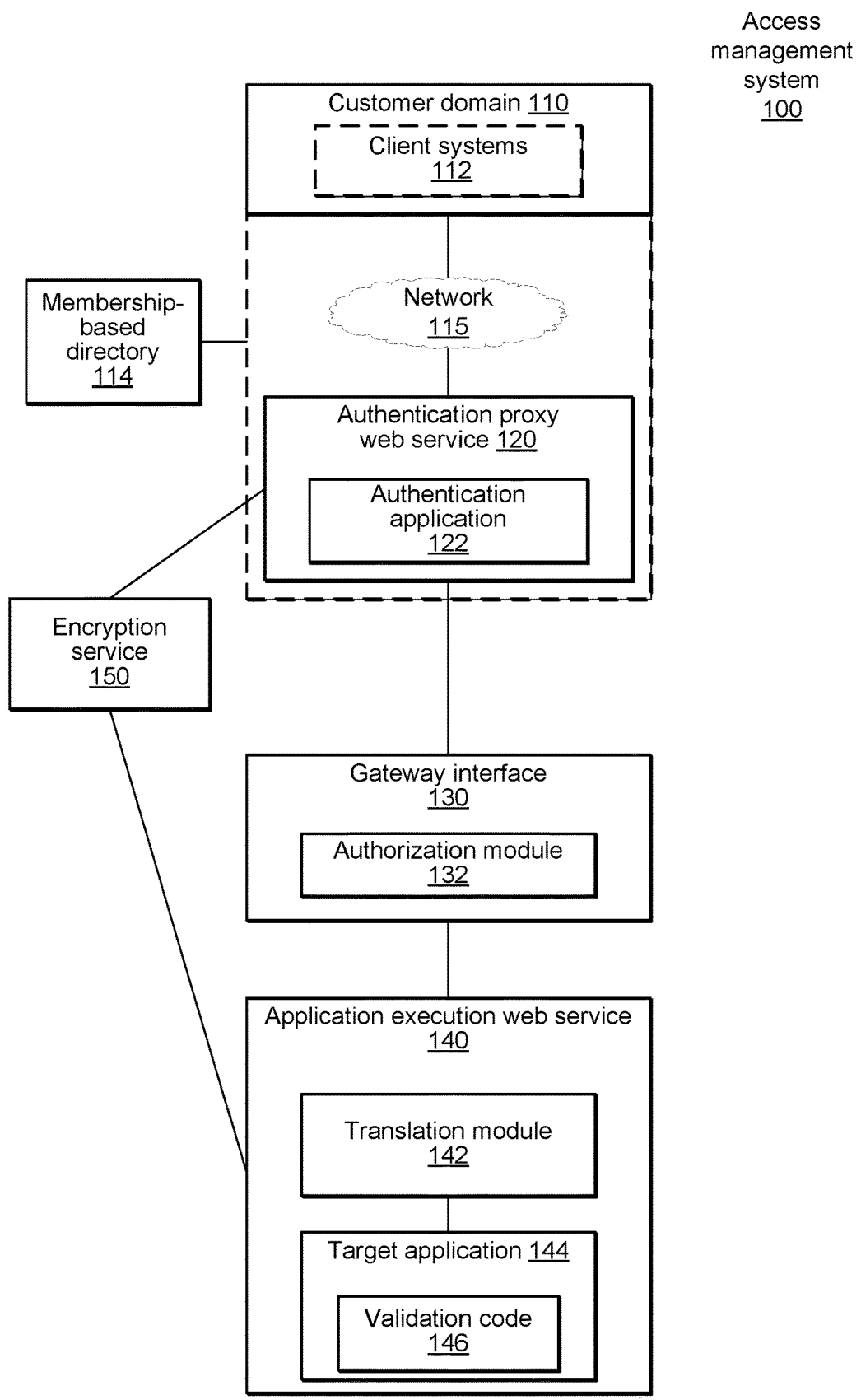
FIG. 1 illustrates an example access management system, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to systems and methods for managing requests from a customer system domain, wherein the requests are requests for access to an application executed by a web service in a cloud computing environment. In one embodiment, an access management system includes an authentication layer (e.g., verifying a user identity) and an authorization layer (e.g., validating a user has permission to access an application). The authentication layer includes a proxy web service to receive a first or original request for access to an application including an authorization header configured in a membership-based authentication protocol (e.g., the Microsoft Windows® Active Directory® protocol, a Lightweight Directory Access Protocol (LDAP), etc.). In one embodiment, since the back-end web-based execution platform hosting the application does not employ membership-based authentication, the proxy web service translates the authorization header into a first object including user identify information (e.g., a user name) and membership information including a list of memberships according to the membership-based authentication protocol (e.g., a protocol wherein permissions are assigned to groups).

In one embodiment, an encapsulated version of the object is sent by the proxy web service to the authorization layer including an interface or gateway operatively coupled to the web-based execution platform hosting the application. The encapsulated version of the object is received by a gateway function that generates a second object including authentication information (user identity information and membership information associated with the user) according to a protocol configured for processing by the web-based execution platform. In one embodiment, the second object is configured with a protocol that is compatible with and enables access to the web-based execution platform. In one embodiment, the web-based execution platform receives the second object, extracts the authentication information in the second protocol, and translates the authentication information of the second object back into the first object (e.g., the object according to the membership-based authentication protocol) as in the original request.

In one embodiment, the web-based execution platform provides the first object to the application executing on the web-based execution platform. In one embodiment, the application validates the request by applying the membership-based authentication protocol to the first object (e.g., the user identity information and the membership information) to determine if the user has the appropriate permissions to perform the requested action (i.e., action in accordance with the permissible level of access associated with the user). Advantageously, the customer's application code, deployed in the web-based execution platform, is written in a same manner as though the application were employing a membership-based authentication protocol on a customer domain-joined computing system. Furthermore, the customer is able to directly upload or port existing application code to the web-based execution platform without changing code relating to the membership-based authentication protocol.

In one embodiment, components of the access management system act as a proxy to rewrite the authentication information and forward the access request, rather than appending additional information to the request and redirecting the request. Advantageously, this approach enables the use of access control lists on encrypted keys (e.g., KMS keys), along with response caching capabilities and execution platform management (e.g., to determine that a sufficient level of execution functions (e.g., Amazon Lambda functions) are available to service the access request workload.

FIG. 1 is a block diagram illustrating an example access management system 100 according to one embodiment. The access management system 100 includes a customer domain 110 including one or more client systems 112 configured to initiate a request for access to a target application 144 executed by an application execution web service 140. In one embodiment, the access management system 100 includes an authentication layer including an authentication proxy web service 120 operatively coupled to an authentication layer including a gateway interface 130 to the application execution web service 140 hosting the target application 144, the components configured to store and execute instructions associated with authenticating and authorizing the target access requests from the customer domain 110, as described in greater detail below in connection with FIGS. 1-5.

In one embodiment, the authentication proxy web service 120 executes on one or more instances (e.g., Internet Information Services (IIS) for Windows® Server instances) in the customer domain 110 (as shown by the dashed line in FIG. 1) or in a cloud computing environment (e.g., an Amazon Elastic Compute Cloud (EC2) server) operatively coupled to the customer domain 110 by a network 115. An instance may be a computing device, which may include one or more physical machines and/or virtual machines hosted by physical machines. The physical machines may be rackmount servers, desktop computers, or other computing devices. In one embodiment, one or more of the instances include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. Some instances may be or include web servers. In one embodiment, the network 150 may be any suitable network type including, for example, the Internet, intranets, extranets, wide area networks (WANs), local area networks (LANs), wired networks, wireless networks, or other suitable networks, etc., or any combination of two or more such networks.

In one embodiment, the authentication proxy web service 120 performs authentication functionality as a lightweight tier on one or more instances (e.g., web servers) within the customer domain 110, while authorization and business functionalities are performed in a highly scalable backend deployment including the application execution web service 140. Advantageously, increased scalability results in a reduction in latency and processing expense associated with scale up using a conventional a customer domain-joined server (e.g., conventional scale-up can include approximately seven minutes for instance build and approximately three minutes for a domain join, reboot, and software installation).

In one embodiment, the authentication proxy web service 120 (also referred to as a "proxy web service") includes the authentication application 122 configured to manage authentication associated with requests for access to the target application 144 received from the client systems 112 of the customer domain 110. In one embodiment, the authentication application (e.g., a Microsoft® Active Server Page (ASP).NET application) receives user identity information and membership information (e.g., a list of group memberships (including nested group memberships) associated with the user, authentication claims, etc.). In one embodiment, the membership information may be stored and managed in a membership-based directory 114 accessible by the customer domain 110. In one embodiment, the membership-based directory 114 is a Microsoft Windows® Active Directory®.

In one embodiment, the authentication application executes as a web service (e.g., the authentication proxy web service) on a web server operatively coupled to the customer domain (e.g., the one or more client systems 112 operatively coupled to customer-controlled networks of the customer domain 110, such as one or more customer-controlled virtual private cloud (VPC)).

In one embodiment, the authentication proxy web service 120 receives a request for access to the target application 144. In one embodiment, the authentication proxy web service 120 extracts information from the request and uses the extracted information to generate a first object. In one embodiment, the first object may be a data structure that represents a system resource, such as a file, thread, or graphic image. In one embodiment, the first object is a security token. In one embodiment, the extracted information includes the user identify information (e.g., a user name) and membership information.

In one embodiment, the first object (also referred to as a "first protocol object" or "claims principal object") includes the user identify information (e.g., a user name) and the membership information configured for processing in accordance with a membership-based authentication protocol (e.g., Microsoft Windows® Active Directory®, LDAP, etc.). In one embodiment, the authentication application 122 receives a request for access with an authorization header using a directory-based or membership-based protocol. In one embodiment, the authorization header may be an NT LAN Manager (NTLM) authorization header. In one embodiment, the authentication application translates the authorization header (received from a client system 112) to generate the first protocol object.

In one embodiment, the authentication proxy web service 120 applies an encapsulation process to encapsulate the first protocol object (also referred to as a "claim principal object"). An example encapsulation process is described below. In one embodiment, the authentication proxy web service 120 serializes, compresses, and encrypts the first protocol object using the encapsulation process. In one embodiment, the encryption may be performed according to any suitable encryption model, such as, for example, a shared trusted provider model employing an encryption service 150 (e.g., the AWS Key Management Service).

In one embodiment, the encapsulated first protocol object is attached as a header (also referred to as an "authorization header") to a web-based request (e.g., a Hypertext Transfer Protocol (HTTP) request) for transmission to the interface layer (e.g., the gateway interface 130) of the application execution web service 140 hosting the target application 144.

In one embodiment, in addition to the authorization header, the authentication proxy web service 120 attaches a second header (e.g., an "x-api-key" header) to include access control information and per-customer request throttling information. For example, the access control information may prevent unauthorized users (e.g. search engine crawlers, script kiddies, etc.) from accessing the gateway interface 130 to initiate execution of an authorization module 132 (described below). In one embodiment, the per-customer request throttling information may be used to prevent authorized client systems 112 from overloading the gateway interface 130 (e.g., exceeding a throttling threshold value) with requests, thereby negatively affecting other customer domains 110 using the gateway interface 130. For example, the gateway interface 130 enables throttling capabilities and approximately 30-45 second scale-up times (e.g., less than default HTTP timeout) and can support multiple concurrent requests (e.g., approximately 40,000 concurrent requests).

In one embodiment, the authentication proxy web service 120 attaches a key to forwarded requests, located either in a file (e.g., an appsettings.json file) or some other data source. In one embodiment, the key may be a single static key, such that users do not have to know or manage an API key (e.g., for use in a single tenant environment (e.g., one customer domain 110 per application execution web service 140)), where throttling is of little concern.

In one embodiment, the key may be a dynamic key retrieved from a data source based on a request condition (e.g. a header value). For example, the target application 144 may be a multi-tenant application that employs the concept of a "tenant," and each HTTP request from a client system includes a "TenantID" header. A multi-tenant application is an application in which a single instance serves multiple customers. A tenant is a group of users who share a common access with specific privileges to an application instance. In one embodiment, the authentication proxy web service 120 may perform a look up in a database or cache for an API key mapped to that TenantID and attach that key to the forwarded request, thereby throttling users based on their respective tenancy.

In one embodiment, the gateway interface 130 includes a cloud-based service to create, publish, maintain, monitor and secure application program interfaces (APIs) to a web application (e.g., an Amazon Elastic Compute Cloud (EC2) application executed by a cloud-based code execution platform (e.g., an Amazon Web Services (AWS) Lambda, etc.). The gateway service (e.g., an Amazon API Gateway), includes a code execution platform (e.g., AWS Lambda) including one or more code sets for executing authorization of the encapsulated first protocol object (also referred to as "authorization module 132").

In one embodiment, the authorization module 132 receives the authorization header with the encapsulated first protocol object and generates an object (also referred to as a "second protocol object" or "second object") including an access control policy and authentication information in a protocol corresponding to the application execution web service 140. In one embodiment the authentication information (also referred to as "second protocol authentication information") is in a format suited for processing or consumption by the code execution platform (e.g., an AWS Lambda computing platform).

In one embodiment, the authorization module 132 receives the encapsulated first protocol object, extracts the original values, and outputs the second protocol object for processing by the application execution web service 140 running the target application 144. In one embodiment, the authorization module 132 includes one or more execution functions (e.g., Amazon Lambda functions) configured to generate an access policy (e.g., an Identity and Access Management (IAM) policy) and authentication information customized for processing by the application execution web service 140 (e.g., in a second authentication protocol format).

In one embodiment, the second protocol object includes a username and the membership information (e.g., the list of the first protocol membership groups of the user) in the second protocol. In one embodiment, the access control policy generated by the authorization module 132 includes policy enabling access to a set of methods of the gateway service that are used by the target application 144 hosted by the application execution web service 140 (e.g., the code execution platform). In one embodiment, the authorization module 132 sets an "allow all" uniform resource identifier (URI)-based access policy which enables the target application to access all of the gateway service methods exposed by the target application (e.g., an AWS Lambda-based ASP.NET application). In one embodiment, the authorization module 132 decrypts and decompresses the authentication header (including the encapsulated first protocol object) to generate the second protocol object. In one embodiment, the second protocol object includes a serialized version of the authentication information (e.g., user account information).

In one embodiment, the authorization module 132 decrypts, decompresses, and deserializes the user information into the second protocol object (e.g., a security token) which can be passed to the application execution web service 140 for consumption. In one embodiment, the back-end application execution web service 140 includes a translation module 142 configured to enable translation of the second protocol object back to the first protocol object (e.g., in the membership-based authentication protocol). In one embodiment, the user identity information and membership information received in the second protocol object format from the authorization module 132 and translate that information back to the first protocol object format of the original request.

In one embodiment, the translated first protocol object is passed to the target application 144 for validation of the request using the validation code 146. In one embodiment, the target application 144 executes validation code 146 with execution authorization mechanisms using the membership-based authentication protocol (e.g., Windows® Active Directory® authentication). In one embodiment, the target application 144 executes the validation code 146 to implement the customer-selected authorization and business logic. In one embodiment, upon receipt of a request, the validation code 146 determines whether or not to validate that the requesting user has the appropriate permissions to perform the requested action. For example, the validation code 146 may use "authorization attributes" (e.g., method decorations in a class) or may call a method of the first protocol object (e.g., the "IsInRole(string rolename)" method of the "Claims Principal" object attached to the request by the application execution web service 140, or may call a customer-developed authorization method.

FIG. 2 illustrates a flowchart that provides an example of a process 200 executed by an access management system (e.g., access management system 100 of FIG. 1), according to various embodiments. It is understood that the flowchart of FIG. 2 provides an example of the many different types of functional arrangements that may be employed to implement the operation of the access management system described herein. Process 200 may be performed by a processing logic that may comprise hardware (e.g., circuitry, dedicated logic, programmable logic, microcode, etc.), software (e.g., instructions run on a processing device), or a combination thereof.

In block 210, a first object associated with a request for access to an application executable by a web service is generated. In one embodiment, the first object (e.g., the first protocol object described above) and the request correspond to a first protocol (e.g., a membership-based authentication protocol). In one embodiment, the first protocol is the Windows® Active Directory® protocol). In one embodiment, the first object is generated by a proxy web service (e.g., the authentication proxy web service 120 of FIG. 1) configured to receive the request for access to the application (e.g., the target application 144 of FIG. 1) executable by the web service (e.g., the application execution web service 140 of FIG. 1) and translate an authorization header (sent by a client system) to the first object. In one embodiment, the first object includes user identity information (e.g., a user name) and membership information (e.g., a list of group membership) associated with the client system that submitted the access request.

In block 220, based on the first object, a second object is generated. In one embodiment, a web-based executable function (e.g., the authorization module 132 of the gateway interface 130 of FIG. 1) generates the second object (e.g. the second protocol object of FIG. 1) for consumption by the backend web service executing the application. In one embodiment, the web-based executable function receives the first object and extracts the original values of the first object (e.g. the user identity information and the membership information) and outputs the information in a format of the second object. Advantageously, the second object may be used to enable access to the application execution web service which implements a different authentication protocol than the protocol associated with the first object (e.g., the first protocol).

In block 230, the second object is translated to the first object. In one embodiment, having gained access to the web service executing the target application, authorization code (e.g., translation module 142 of FIG. 1) may be employed to translate the second object to the first object for consumption by the target application. In one embodiment, the authorization code of the web service translates the user identity information and membership information of the second object back into the first object (as provided in the original request).

In block 240, the application executing on the web service (e.g., the target application) determines a validity of the request using the first object. In one embodiment, the application employs a same authorization methodology (e.g., a membership-based protocol) to validate the request.

Figure 3:
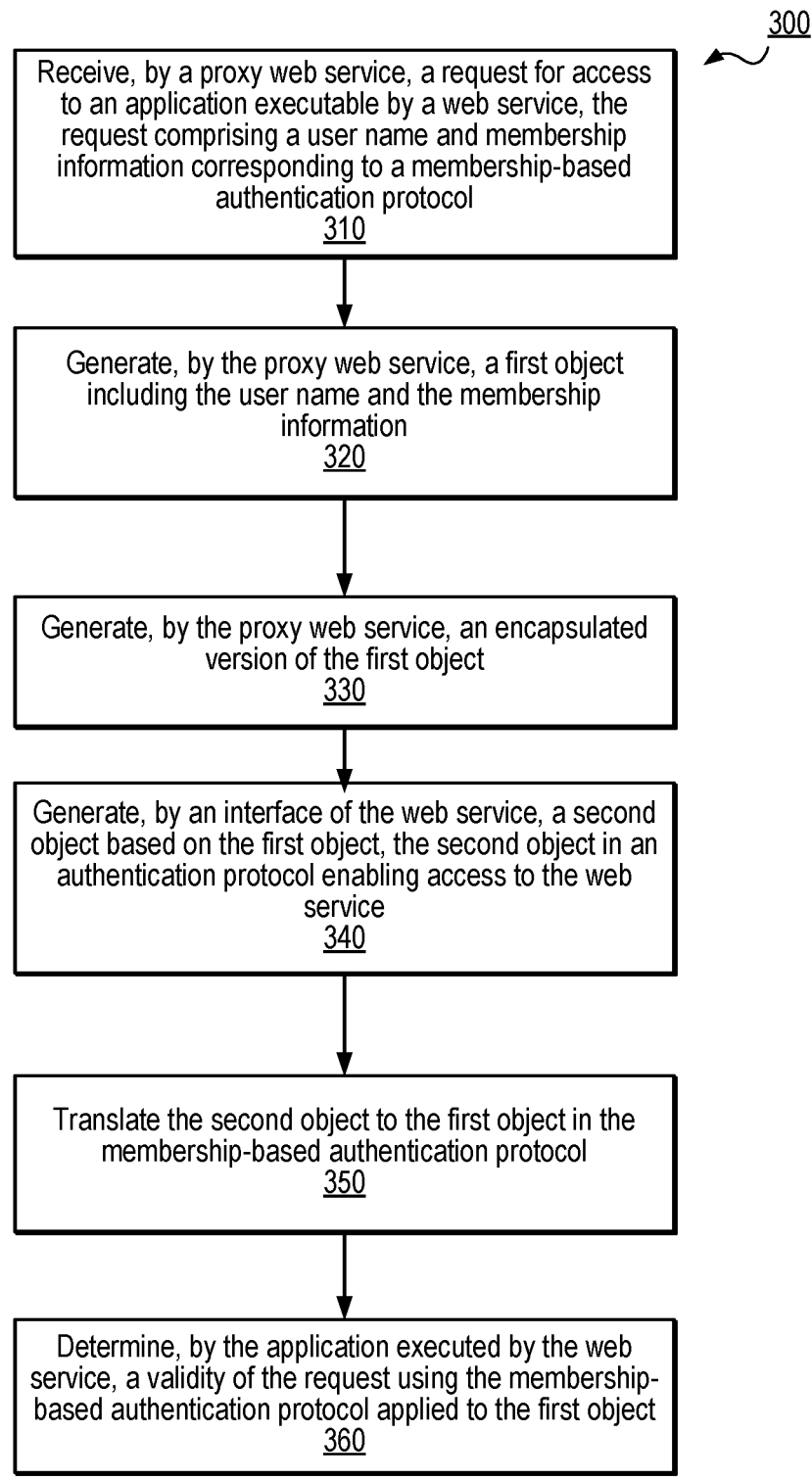
FIG. 3 is a flow diagram illustrating an example method of access management processing, according to one embodiment.

FIG. 3 illustrates a flowchart that provides an example of a process 300 executed by a proxy web service (e.g., authentication proxy web service 120 of FIG. 1) and a web service configured as an application execution platform (e.g., application execution web service 140 and gateway interface 130 of FIG. 1) of an access management system (e.g., access management system 100 of FIG. 1), according to various embodiments. In block 310, the proxy web service e.g., authentication proxy web service 120 of FIG. 1) receives a request for access to an application (e.g., target application 144 of FIG. 1) executable by the web service (e.g., application execution web service 140 of FIG. 1). In one embodiment, the request is received from a client system operating in a customer domain operatively coupled to a membership-based directory associated with a membership-based authentication protocol. In one embodiment, the request includes user identity information (e.g., a user name) and membership information (e.g., a list of membership groups associated with the user) corresponding to the membership-based authentication protocol.

In one embodiment, the customer domain includes a client software development kit (SDK) configured to enable interactions between the client system and the proxy web service. In one embodiment, the client SDK is a code library that configures client-side logic into a set of functions that may be processed directly by the one or more applications running on the web service. In one embodiment, the client SDK includes code to send HTTP requests using a membership-based authentication protocol (e.g., Windows® Active Directory® authentication) to the proxy web service and formats communications (e.g., responses) received from the proxy web service.

In one embodiment, in block 310, the client system (e.g., using the client SDK) presents a user certificate or a client system certificate in the request to the web service. In one embodiment, the user certificate or client system certificate are issued to the user or client system at first logon by a certificate authority associated with the membership-based authentication protocol. In one embodiment, the proxy web service performs validation on the client certificate (e.g., confirming the validity dates match, the issuer is trusted by the web server, etc.)

In block 320, the proxy web service generates a first object including the user name and the membership information. In one embodiment, the proxy web service translates an authorization header (e.g., an NTLM authorization header) received from the client system to the first object (e.g., a "claims principal" object) which includes the user name and an expanded list of the user's group memberships (e.g., including nested memberships, if applicable). In one embodiment, the proxy web service forwards the request to the gateway interface, pursuant to membership-based authentication protocol processing, and attaches the encapsulated first object (e.g., a thumbprint of the customer certificate) in the authorization header (e.g., as an "x-certificate" header).

In block 330, the first object (e.g., the first protocol object of FIG. 1) is encapsulated to generate an authentication header for requests sent by the proxy web service to the interface (e.g., the gateway interface 130 of FIG. 1) of the application execution web service by the proxy web service. In one embodiment, the proxy web service serializes, compresses, and encrypts the first object using a suitable encapsulation process.

According to an example encapsulation process, the proxy web service determines a UTC date in format "yyyyMMddHHmmssK" (e.g., 20171230235901+08:00). The proxy web service also determines a membership-based protocol user identifier (User ID) from the request (e.g., EXAMPLE\yancej).

Next, the proxy web service serializes the object including the user claims (e.g., one or more statements associated with the user, such as a name, identity, key, group, privilege, or capability). To serialize the claims, the proxy web service enumerates the claims belonging to the user (e.g., an array of objects, such as Windows® SecurityIdentifier objects) and translates each object to a string. The generated string may be used as a name of the associated membership group (e.g., EXAMPLE\Domain Users). In the serialization, the proxy web service then joins the list of group memberships into a single string (e.g., tabular data (numbers and text) in plain text with each line of the file is a data record including one or more fields separated by commas). In one embodiment, the string is a comma-separated string. Alternatively other formats of strings may be used.

In this example encapsulation process, having serialized the user claims, the proxy web service concatenates the user identifier and the serialized claims string using a special character (e.g., the character) to form a concatenated representation, such as "EXAMPLE\yancej@EXAMPLE\Domain Users, EXAMPLE\Corpsys-Core)". In one embodiment, the concatenated string is compressed using a suitable compression mechanism (e.g., GZip compression) and converted to a byte array using a suitable encoding mechanism (e.g., UTF8 encoding). The compressed byte array is encrypted using a suitable encryption process (e.g., KMS encryption). In one embodiment, the encryption process uses the generated date string as an encryption context for entropy and limiting validity lifetime of authorization headers. In one embodiment, the encrypted value is converted to a binary-to-text string (e.g., a Base64 string). The proxy web service may then concatenate the plaintext date string and the binary-to-text result string using a special character (e.g., the "@" character).

Figure 4:
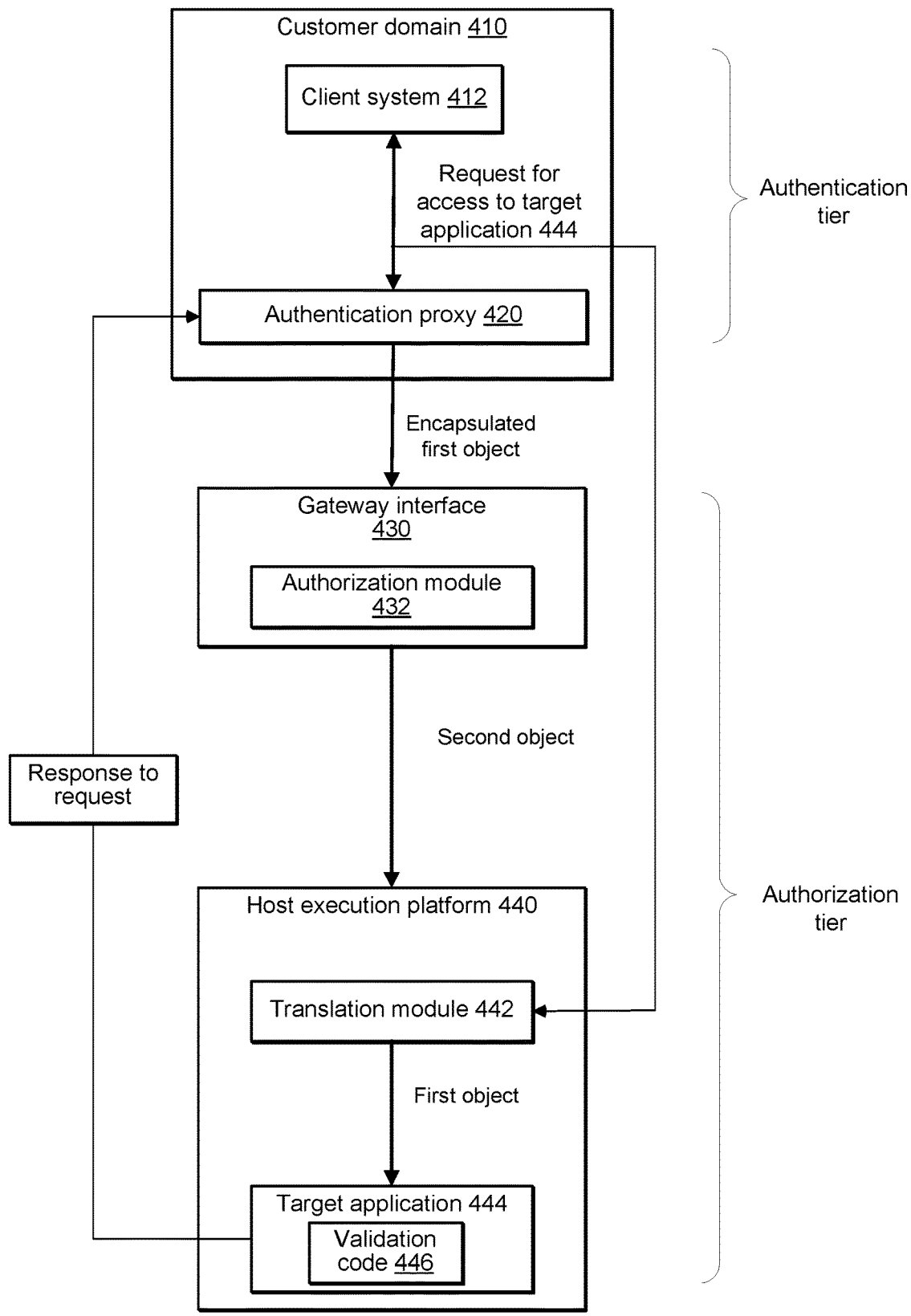
FIG. 4 illustrates exemplary sets of operations of an access management system, according to one embodiment.

As shown in FIG. 4, in block 340, the interface (e.g., gateway interface 130 of FIG. 1) of the application execution web service receives the encapsulated version of the first object and generates a second object. In one embodiment, the second object is generated by an executable function (e.g., authorization module 132 of FIG. 1) based on the first object (e.g., extracting user identity and claims values from the first object), wherein the second object is configured according to an authentication protocol enabling access the web service hosting the target application.

In one embodiment, the authorization module of the gateway interface, upon receiving the request including the authentication header (e.g., the encapsulated first object) from the proxy web service, parses the date string from the beginning of the authentication header value. In one embodiment, the authorization module converts the date string into a date and validates that the value is not older than a threshold quantity of minutes (e.g., no older than X minutes). In one embodiment, the authorization module converts the remainder of the authentication token from a Base64 string to a byte array. Next, using the applicable encryption protocol (e.g., KMS), the authorization module decrypts the result using the date string as the encryption context. The authorization module decompresses the decrypted value and converts it to a string using an encoding method (e.g., UTF8 encoding). In one embodiment, the customer authorizer splits the decoded string at the special character (e.g., the "@" character) to create an array containing two elements: 1) the user identifier and 2) a comma-separated value (CSV) list of the group membership information.

In one embodiment, the authorization module generates the second object in a format that may be processed by the gateway interface. For example, the second object may have a format such as "principalId" for the user identifier and "stringValue" for the CSV list of group memberships.

In block 350, the web service receives the request and the second object and translates the second object to the first object in the membership-based authentication protocol. In block 360, the application executed by the web service determines a validity of the request using the membership-based authentication protocol. In one embodiment, the application generates a response to the request (e.g., a result of the validity determination) and sends the response to the proxy web service for returning to the client system (e.g., the originator of the access request).

In one embodiment, the web service includes a function (e.g., translation module 142 of FIG. 1) that intercepts the request and retrieves certificate metadata (e.g., validity dates, public key, etc.), such as, for example, using the value in the authorization header, e.g., the "x-certificate" header. In one embodiment, the authorization module determines the certificate validity based on the metadata (e.g., validity dates, public key, etc.) stored in cloud-based storage (e.g., Amazon Simple Storage Service (S3)). In one embodiment, the authorization module generates a key (e.g., an Advanced Encryption Standard (AES) symmetric data key using KMS encryption) and encrypts a body of a response to the request using the AES data key. The authorization module encrypts the key (e.g., a symmetric data key) using a public key stored in the certificate metadata and adds the encrypted data key to a header for the response (e.g., an "x-data-key" response header).

In one embodiment, the proxy web service receives the response from the application and decrypts the "x-data-key" header value using a private key of a customer certificate. In one embodiment, the proxy web service decrypts the response body using the decrypted data key (e.g., the AES data key) and returns the decrypted response to the client system over an established mutual session (e.g., a Transport Layer Security (TLS) session).

FIG. 4 illustrates components of an access management system 400 including an authentication tier including an authentication proxy 420 operatively coupled to a client system 412 operating in a customer domain 410. In one embodiment, the access management system 400 includes an authorization tier including a gateway interface 430 operatively coupled to a host execution platform 440 providing execution functionality for a target application 444.

In one embodiment, the authentication proxy 420 running on one or more customer instances (e.g., IIS instances) in the customer domain 410 receives, from a client system 412, a request for access to the target application 444. In one embodiment, the authentication proxy 420 serializes, compresses, and encrypts the request and appends user information to an authentication header to generate an encapsulated first object. The authentication proxy 420 sends the encapsulated first object to the gateway interface 430. In one embodiment, the gateway interface 430 includes a function (e.g., the authorization module 432) configured to decrypt, decompress and deserialize the encapsulated first object to generate a second object for consumption by the host execution platform 440.

In one embodiment, the host execution platform 440 includes a translation module 442 (e.g., one or more executable functions) that intercepts the access request and uses the second object (received from the authorization module 432) to update or rehydrate the request with the user account information. In one embodiment, this update or rehydration is part of the translation of the second object to the first object for processing by the target application 444 using the validation code 446 configured to authenticate according to a membership-based authentication protocol. Advantageously, the target application 444 and the validation code 446 are coded in the same manner as if a membership-based authentication protocol was being employed by a computing system within the customer domain 410. In one embodiment, a customer may deploy existing validation code 446 with the code corresponding to the translation module 442 to the host execution platform 440 for execution, to preserve the use of the membership-based authentication protocol. It is understood that the diagram of FIG. 4 provides an example of one embodiment of the many different types of functional arrangements that may be employed to implement the operation of the access management system 400, as described herein. The processes depicted may be performed by a processing logic that may comprise hardware (e.g., circuitry, dedicated logic, programmable logic, microcode, etc.), software (e.g., instructions run on a processing device), or a combination thereof.

Figure 5:
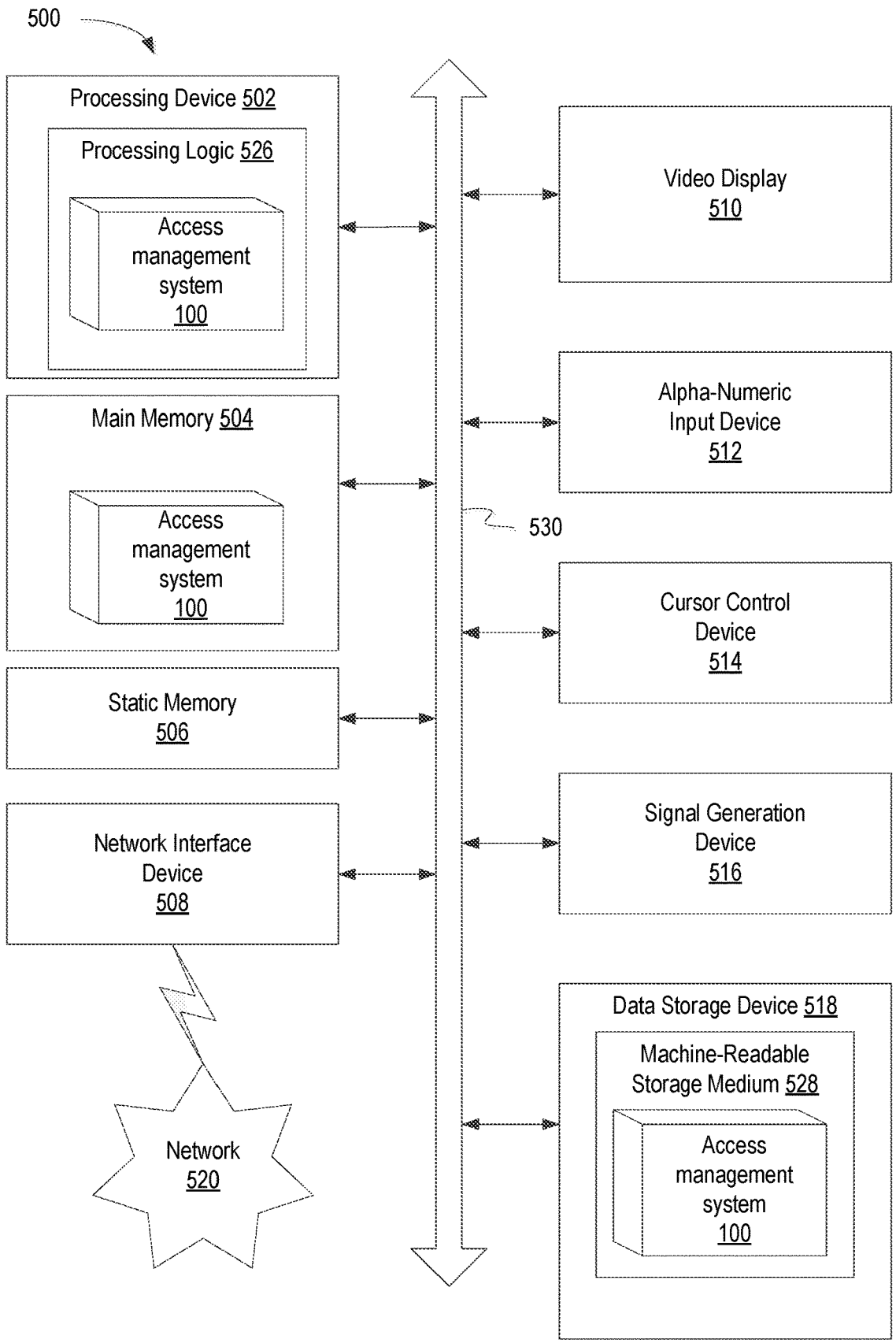
FIG. 5 is a schematic block diagram that provides an example illustration of a computing environment executing instructions relating to an access management system, according to one embodiment.

FIG. 5 illustrates a diagrammatic representation of a machine in the example form of a computer system 500 including a set of instructions executable by an access management system 100 to cause the system to perform any one or more of the methodologies discussed herein. In one embodiment, the web services of the access management system may include instructions to enable execution of the processes and corresponding components shown and described in connection with FIGS. 1-5.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for the access management system 100 for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions of the access management system 100 embodying any one or more of the methodologies or functions described herein. The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "translating", "determining", "receiving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a first web service, a request for access to an application executable by a second web service, the request comprising a user identity information and membership information comprising a list of one or more groups associated with the user identity information, wherein the request corresponds to a membership-based authentication protocol;
   generating, by the first web service, a first object including the user identity information and the membership information;
   generating, by the first web service, an encapsulated version of the first object;
   extracting, by an interface of the second web service, the user identity information and the membership information from the encapsulated version of the first object;
   generating, by the interface of the second web service, a second object comprising the user identity information and the membership information in an authentication protocol enabling access to the second web service;
   translating the second object to the first object in the membership-based authentication protocol; and
   determining, by the application executed by the second web service, a validity of the request using the membership-based authentication protocol applied to the first object.

2. The method of claim 1, wherein the request is received from a client system operating in a customer domain.

3. The method of claim 2, wherein the first web service executes in the customer domain.

4. The method of claim 1, wherein the encapsulated version of the first object comprises a serialized, compressed, and encrypted version of the user identity information and membership information.

5. A system comprising:
   one or more processing devices; and
   a memory to store computer-executable instructions that, if executed, cause the one or more processing devices to:
   generate a first object associated with a request for access to an application executable by a web service, the request corresponding to a membership-based authentication protocol, wherein the request comprises user identity information and membership information comprising a list of one or more groups associated with the user identity information;
   extract the user identity information and the membership information from the first object;
   generate a second object comprising the user identity information and the membership information in a second protocol enabling access to the web service executing the application;
   translate the second object to the first object; and
   determine, by the application executed by the web service, a validity of the request using the membership-based authentication protocol applied to the first object.

6. The system of claim 5, wherein the first object comprises the user identity information and the membership information.

7. The system of claim 5, wherein an encapsulated version of the first object is attached as a header to a communication sent to an interface of the web service.

8. The system of claim 7, wherein the encapsulated version comprises a serialized, compressed, and encrypted version of the user identity information and the membership information associated with the request.

9. The system of claim 5,
   wherein the second object comprises the user identity information and a comma-separated list of the membership information.

10. The system of claim 5, wherein the application executes validation code on the web service to determine the validity of the request.

11. The system of claim 5, wherein the membership information is stored in a directory residing in a customer domain.

12. The system of claim 5, wherein the second object comprises a deserialized, decompressed, and decrypted version of the user identity information and the membership information associated with the request.

13. A non-transitory computer-readable storage device storing computer-executable instructions that, if executed by one or more processing devices, cause the one or more processing devices to:
   receive, by a first web service, a request for access to an application executable by a second web service, the request comprising user identity information and membership information corresponding to a membership-based authentication protocol;
   generate, by the first web service, a header comprising an encapsulated version of the user identity information and the membership information;
   extract, by an interface of the second web service, the user identity information and the membership information from the header;
   generate, by the interface, a security token comprising a user name and a comma-separated list comprising the membership information;
   translate, by the second web service, the user name and the comma-separated list to an object corresponding to the user identity information and the membership information of the request; and
   determine, by the application executing on the second web service, a validity of the request using the membership-based authentication protocol applied to the object.

14. The non-transitory computer-readable storage device of claim 13, wherein the encapsulated version comprises a serialized, compressed, and encrypted version of the user identity information and the membership information associated with the request.

15. The non-transitory computer-readable storage device of claim 13, wherein the membership information comprises a list of groups associated with the user identity information.

16. The non-transitory computer-readable storage device of claim 15, wherein the request is received from a client system operating in a customer domain.

17. The non-transitory computer-readable storage device of claim 16, wherein the proxy web service executes in the customer domain.

18. The non-transitory computer-readable storage device of claim 13, wherein the application executes validation code on the web service to determine the validity of the request.

19. The non-transitory computer-readable storage device of claim 13, wherein the validation code executes the membership-based authentication protocol.

* * * * *